(12) United States Patent
Amano

(10) Patent No.: US 7,485,247 B2
(45) Date of Patent: *Feb. 3, 2009

(54) CONTROL SYSTEM FOR AN INJECTION MOLDING MACHINE AND A METHOD FOR CONTROLLING THE INJECTION MOLDING MACHINE

(75) Inventor: Mitsuaki Amano, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 11/522,918

(22) Filed: Sep. 19, 2006

(65) Prior Publication Data

US 2007/0007683 A1    Jan. 11, 2007

Related U.S. Application Data

(63) Continuation of application No. 10/436,979, filed on May 14, 2003, now Pat. No. 7,128,854.

(30) Foreign Application Priority Data

May 16, 2002  (JP)  ............................. 2002-141423

(51) Int. Cl.
    B29C 45/77    (2006.01)
(52) U.S. Cl. ...................... 264/40.1; 425/145; 425/149

(58) Field of Classification Search .............. 264/40.1, 264/40.5, 40.7; 425/145, 149, 150, 146, 425/147

See application file for complete search history.

(56) References Cited

U.S. PATENT DOCUMENTS

| 4,802,267 | A | 2/1989 | Hosoya |
| 5,371,450 | A | 12/1994 | Hiraoka |
| 6,042,760 | A | 3/2000 | Nakazawa et al. |
| 6,416,694 | B1 | 7/2002 | Ishikawa |
| 2001/0026031 | A1 | 10/2001 | Onishi |

FOREIGN PATENT DOCUMENTS

| EP | 1 063 073 A2 | 12/2000 |
| JP | 05138686 | 6/1993 |
| JP | 05278089 | 10/1993 |
| JP | 11-90965 | 4/1999 |
| JP | 2002-79561 | 3/2002 |

*Primary Examiner*—Jill L Heitbrink
(74) *Attorney, Agent, or Firm*—Squire, Sanders & Dempsey L.L.P.

(57) ABSTRACT

A control system for an injection molding machine performs a molding cycle. The molding cycle includes a filling process for controlling an advancing motion of a screw of the injection molding machine, and a hold press process for controlling a pressure of a molten resin after the filling process. The control system includes retracting speed limit means for limiting a retracting speed of the screw to a predetermined retracting speed limit value after a pressure control in the hold press process begins.

17 Claims, 6 Drawing Sheets

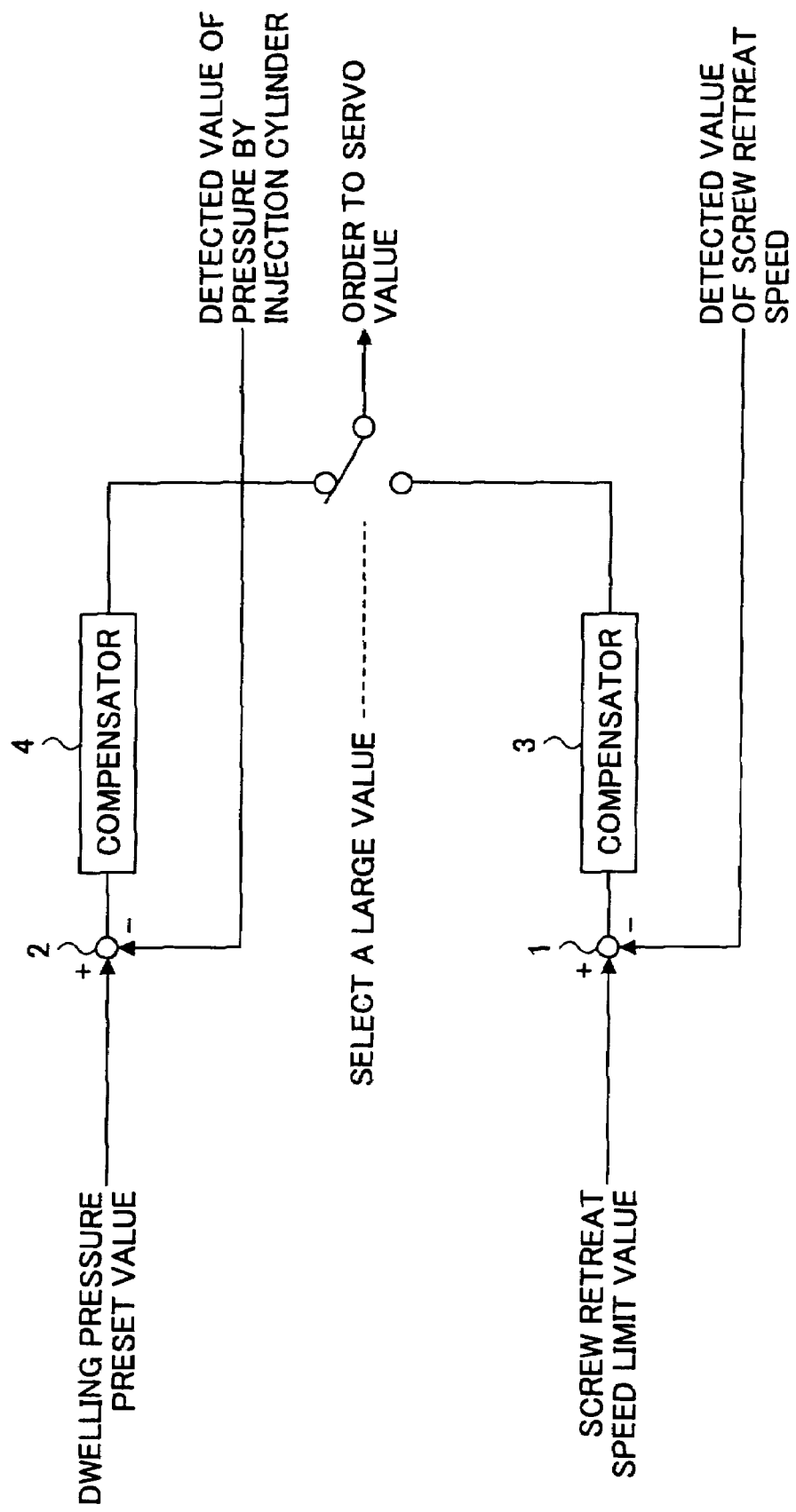

CONTROL SYSTEM FOR AN INJECTION MOLDING MACHINE AND A METHOD FOR CONTROLLING THE INJECTION MOLDING MACHINE

CROSS-REFERENCE TO RELATED APPLICATIONS

This is a Continuation of U.S. patent application Ser. No. 10/436,979, filed on May 14, 2003. The subject matter of this previously filed application is hereby incorporated by reference.

BACKGROUND OF THE INVENTION

1. Field of the Invention

The present invention generally relates to control systems for injection molding machines and methods for controlling the injection molding machines. More particularly, the present invention relates to a control system for an injection molding machine performing a molding cycle including a filling process and a hold press process following the filling process, and a method for controlling the injection molding machine.

2. Description of the Related Art

First, an explanation will be given of a molding cycle of an injection molding machine, comprising a plasticizing process, a metering process, a filling process and a hold press process in a case of a motor-driven injection molding machine as an example.

(1) Plasticizing Process/Metering Process

In the plasticizing and metering processes, a servo-motor for screw rotation rotates the screw. The screw is located within a heating cylinder. Resin is fed from a hopper to the rear portion of the screw in the heating cylinder. By the rotation of the screw, the resin provided to the rear portion of the screw from the hopper is melted and a given amount thereof is fed to the tip end of the heating cylinder. During this time, the screw is retracted while being subjected to a back pressure, namely the pressure of molten resin accumulating at the tip end of the heating cylinder.

An injection shaft is directly connected to a rear end portion of the screw. The injection shaft is rotatably supported by a pressure plate through a bearing. The injection shaft is driven in the axial direction by a servo-motor for injection that is supported on the pressure plate. The pressure plate is driven through a ball screw by a servo-motor for injection to advance and retract along guide bars. The foregoing back pressure of molten resin is detected by a load cell in a manner described later. The detected value of the load cell is controlled by a feed-back control loop for pressures.

(2) Filling Process

Then, in the filling process, driving of the servo-motor for injection causes the pressure plate to advance to fill molten resin into a mold with the screw tip end as a piston. Resin pressure at the screw tip end at this time is detected as an injection pressure.

At the end of the filling process, the molten resin fills a cavity of the mold. At that point, the advancing motion of the screw causes switching of velocity control to pressure control. Such switching of velocity control to pressure control is referred as a V-P switching and affects the quality of the resultant molded article.

(3) Hold Press Process

Following the V-P switching, the resin within the cavity of the mold is allowed to cool under a preset pressure. This process is referred to as a hold press process. In the hold press process, resin pressure is controlled with a feed-back control loop as in the above-mentioned back pressure control.

In an injection apparatus of the injection molding machine, when the process (3) is completed, the control system goes back to the process (1) and shifts to the succeeding molding cycle. In a mold clamping apparatus of the injection molding machine, concurrently with the process (1), the mold is opened to permit an ejector mechanism to discharge a molding product having been cooled and solidified, and then the mold is closed for the process (2).

Meanwhile, for injection molding, measurement precision greatly depends on the profile of the resin pressure in the filling and hold press processes. For example, in a case of manufacturing a thin-walled molded article, due to differences of the resin pressure just after the V-P switching in particular, molding defects phenomena such as a short shot, sink, flash, warpage, and the like may be generated every so often.

There are V-P switching position settings, injection speed settings, hold press settings and the like as molding conditions in order to prevent the above mentioned molding defects phenomena. An operation for the above mentioned settings is called a molding condition determination. The molding condition determination is complex because the above mentioned settings influence each other. Hence, only the "hold press settings" and "time settings" are used as the molding conditions in the conventional hold press process and several values of pressure are set as the hold press settings.

For example, in a case where the resin pressure at the time of V-P switching is high, if the hold press pressure that makes the resin pressure low is set as a hold press setting value, the screw retracts. However, if the retracting speed is not controlled, as described later, there are problems in that the molded article is adversely affected.

FIG. 1 is a view for explaining the filling process and hold press process of the molding cycle when a conventional method for controlling is applied.

More specifically, FIG. 1-(a) shows a profile of injection speeds in the filling process and hold press process of the molding cycle when a conventional method for controlling is applied; FIG. 1-(b) shows a profile of the resin pressure in the filling process and hold press process of the molding cycle when a conventional method for controlling is applied; FIG. 1-(c) shows a profile of a screw position, that is the distance between the tip end of the screw and the end part at the nozzle side of the heating cylinder, in the filling process and hold press process of the molding cycle when a conventional method for controlling is applied.

In FIG. 1-(a), positive injection speed represents an advancing of the screw and negative injection speed represents a retracting of the screw. As shown in FIG. 1-(b), for convenience, only a first segment of pressure setting in the hold press process is shown as an example. Control for the hold press process is performed based on setting the hold press pressure Ph1 and time t1.

As the injection begins, the screw advances as shown in FIG. 1-(a), and the distance between the tip end of the screw and the end part at the nozzle side of the heating cylinder is shortened, so that the resin fills the cavity of the mold.

There is a case where the volume of the resin in the cavity increases when the molten resin compressed by a gate of the screw tip end is injected into the cavity of the mold. In this case, even if the pressure of the screw head part is changed in order to change the hold press pressure in the hold press pressure process, the resin in the cavity is seldom influenced or reacts excessively.

In a case where the resin pressure at the time of the V-P switching is high, when the first hold press setting value is set so as to reduce the resin pressure, the screw retracts. That is, a retracting speed of the screw is generated. Particularly, in a case where there is a big difference between the resin pressure at the time of the V-P switching and the first hold press setting value Ph1, as shown in a part surrounded by a dotted line in FIG. 1-(a), the retracting speed of the screw becomes high. If the retracting speed of the screw becomes high, a negative pressure is applied to the molten resin. As a result of this, an adverse effect on the molten resin, such as the generation of a void in the molten resin, may be invited.

SUMMARY OF THE INVENTION

Accordingly, it is a general object of the present invention to provide a novel and useful control system for an injection molding machine and method for controlling the injection molding machine, in which one or more of the problems described above are eliminated.

Another and more specific object of the present invention is to provide a control system of an injection molding machine and a method for controlling the injection molding machine, whereby after the V-P switching is performed, in the hold press process, a retraction of the screw at a high speed is controlled so that the measurement precision of the molded article can be improved.

It is also an object of the present invention to provide a control system for an injection molding machine that performs a molding cycle, the molding cycle including a filling process for controlling an advancing motion of a screw of the injection molding machine, and a hold press process for controlling a pressure of a molten resin after the filling process, the control system comprising retracting speed limit means for limiting a retracting speed of the screw to a predetermined retracting speed limit value after a pressure control in the hold press process begins.

The control system may further include:

pressure detection means for detecting a hold press pressure that is a resin pressure in the hold press process; and speed detecting means for detecting the retracting speed of the screw, wherein the retracting speed limit means includes:

first calculation means for calculating a first operation amount based on a first difference between the retracting speed detected by the speed detecting means and the predetermined retracting speed limit value;

second calculation means for calculating a second operation amount based on a second difference between the hold press pressure detected by the pressure detection means and a hold press pressure preset value; and control means for controlling the retracting speed of the screw based on the first operation amount when the first operation amount is greater than the second operation amount, and for controlling the hold press pressure based on the second operation amount when the first operation amount is equal to or less than the second operation amount.

It is also an object of the present invention to provide a method for controlling an injection molding machine that performs a molding cycle, the molding cycle including a filling process for controlling an advancing motion of a screw of the injection molding machine, and a hold press process for controlling a pressure of a molten resin after the filling process, the method comprising a step for limiting a retracting speed of the screw to a predetermined retracting speed limit value after a pressure control in the hold press process begins.

It is also an object of the present invention to provide a method for controlling an injection molding machine comprising the steps of:

a) advancing a screw of the injection molding machine so that a cavity of a mold is filled with molten resin;

b) retracting the screw based on a difference between a detected pressure of the molten resin and a predetermined pressure of the molten resin; and c) limiting a retracting speed of the screw until the detected pressure of the molten resin reaches the predetermined pressure.

It is also an object of the present invention to provide a control system for an injection molding machine, the injection molding machine including a screw which is advanced by a driving device so that a cavity of a mold is filled with molten resin, and which is retracted based on a difference between a detected pressure of the molten resin and a predetermined pressure of the molten resin after the mold is filled with the molten resin, the control system comprising a controller for limiting a retracting speed of the screw until the detected pressure of the molten resin reaches the predetermined pressure.

Thus, in the present invention, a limit of the retracting speed of the screw is added as a molding condition in the hold press process, so that a control in the hold press process is automatically switched to either a hold press pressure control or a screw retracting speed control.

Other objects, features, and advantages of the present invention will become more apparent from the following detailed description when read in conjunction with the accompanying drawings.

BRIEF DESCRIPTION OF THE DRAWINGS

FIG. 6 is a function block diagram of retracting speed limit means in the hold press process performed by a controller of the control system for the hydraulic type injection molding machine of the embodiment of the present invention.

DETAILED DESCRIPTION OF THE PREFERRED EMBODIMENT

A description will now be given, with reference to FIGS. 2 through 6, of embodiments of the present invention.

First, an outline of the injection molding machine to which the present invention is applied, will be described.

Figure 1:
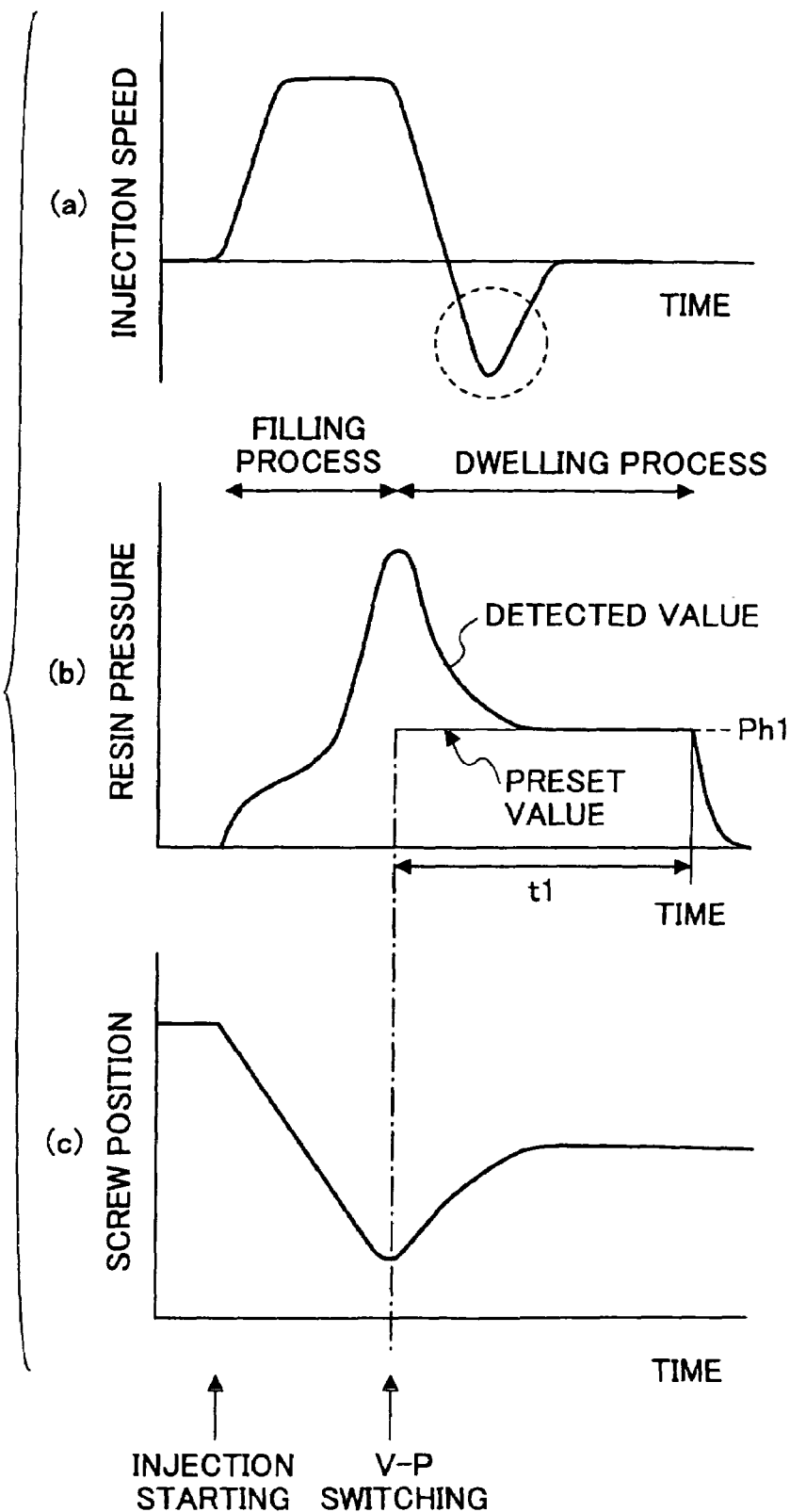
FIG. 1 is a view for explaining the filling process and hold press process of the molding cycle when a conventional method for controlling is applied.
Figure 2:
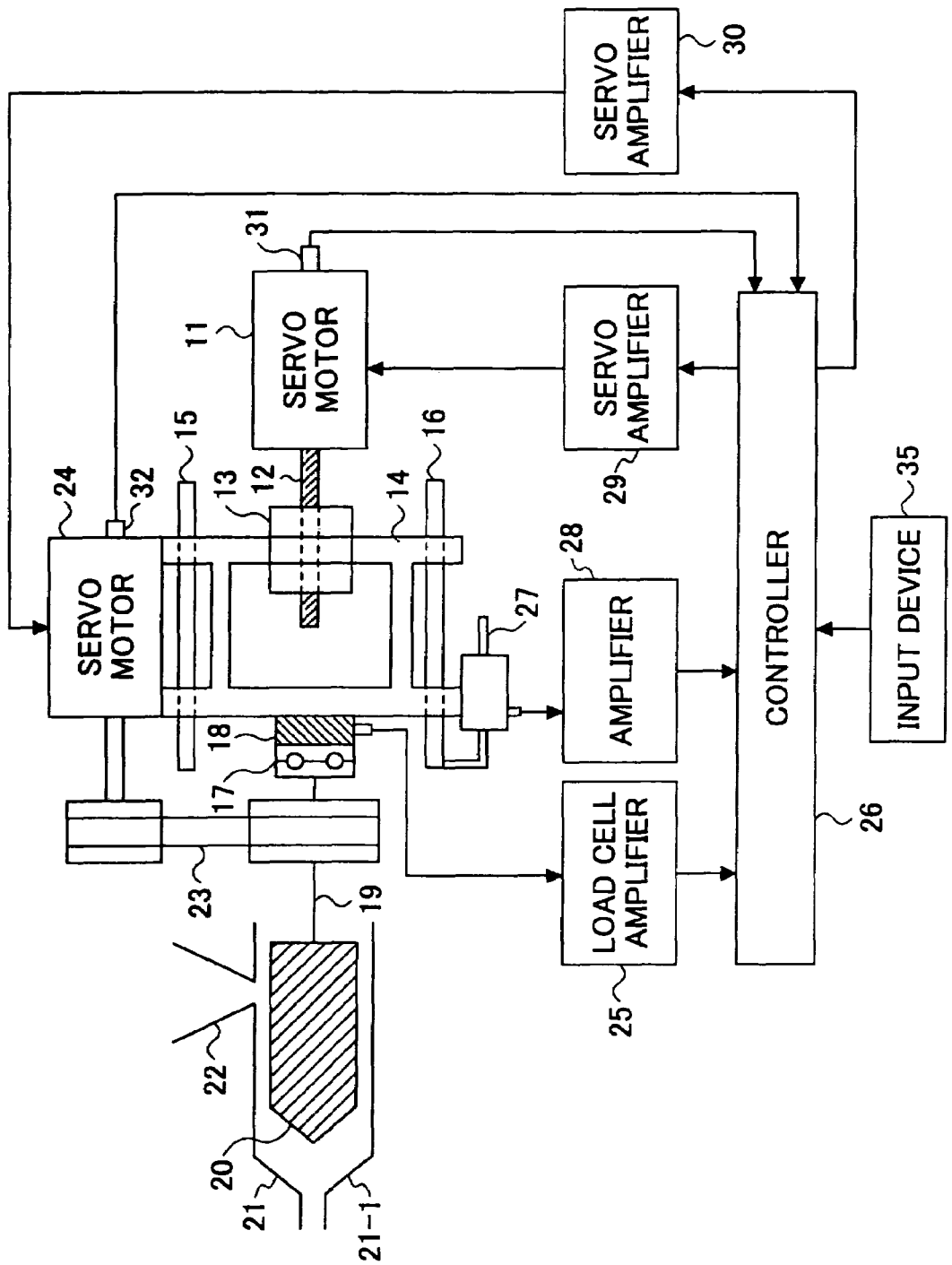
FIG. 2 is a view showing a schematic structure example of a motor-driven injection molding machine having an injection apparatus driven by a servo motor, wherein a control system and a method for controlling of an embodiment of the present invention are applied.

FIG. 2 is a view showing a schematic structure example of a motor-driven injection molding machine having an injection apparatus driven by a servo motor, wherein a control system and a method for controlling of an embodiment of the present invention are applied.

Referring to FIG. 2, rotation of the servo-motor 11 for injection is transmitted to a ball screw 12. A nut 13 adapted to advance and retract upon rotation of the ball screw 12 is fixed to a pressure plate 14. The pressure plate 14 is movable along a plurality of guide bars 15 and 16 fixed to a base frame (not shown). Advancing and retracting movements of the pressure plate 14 are transmitted to a screw 20 via a bearing 17, a load cell 18, and an injection shaft 19.

The screw 20 is positioned within a heating cylinder 21 such that the screw 20 is rotatable about and movable in the axial directions. The heating cylinder 21 at the part corresponding to the rear portion of the screw 20 is equipped with a hopper 22 for feeding a resin. A rotation motion of a servo motor 24 for screw rotation is transmitted to the injection shaft 19 via a connection member 23 such as a belt or a pulley. That is, the screw 20 is rotated by rotational driving of the injection shaft 19 with the servo motor 24 for screw rotating.

In the plasticizing and the metering processes, rotational driving of the servo-motor 24 causes the screw 20 to retract in the heating cylinder 21 while rotating whereby molten resin is accumulated at the front side of the screw 20, namely the side of a nozzle 21-1 of the heating cylinder 21.

In the filling process, rotational driving of the servo-motor 11 causes advancement of the screw 20 to thereby fill the mold with the accumulated, molten resin and pressurize the resin for molding. At this time, forces, which push the resin, are detected as reaction forces by the load cell 18. That is, the resin pressure at the tip end part of the screw is detected. A detected value from the load cell 18 is amplified by a load cell amplifier 25 to be input into a controller 26.

A position detector 27 is mounted on the pressure plate 14 so as to detect amounts of movements of the screw 20. A detected value from the position detector 27 is amplified by an amplifier 28 to be input into the controller 26.

In accordance with setting established by an input device 35 with an operator, the controller 26 outputs to servo-amplifiers 29 and 30 current (torque) commands depending upon the respective processes.

The servo-amplifier 29 controls the drive current of the servo-motor 11 to control output torque of the motor 11. The servo-amplifier 30 controls the drive current of the servo-motors 24 to control output torque of the motor 24.

An encoder 31 for detecting the number of revolution of the servo motor 11 is provided for the servo motor 11. An encoder 32 for detecting the number of revolution of the servo motor 24 is provided for the servo motor 24. The number of revolution detected by the encoders 31 and 32 are input to the controller 26 respectively.

Figure 3:
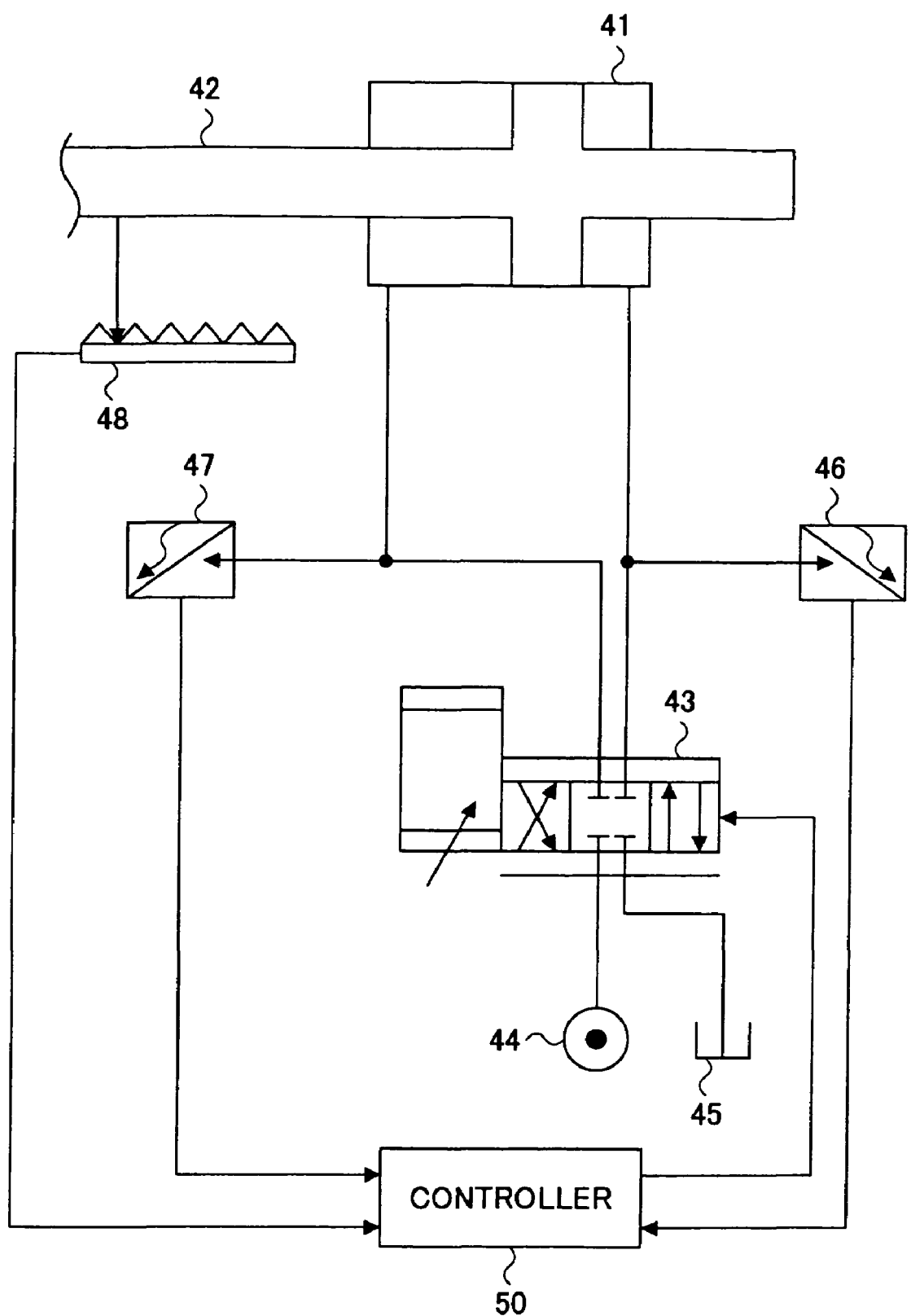
FIG. 3 is a view showing a schematic structure example of a hydraulic type injection molding machine, wherein a control system and a method for controlling of an embodiment of the present invention are applied.

FIG. 3 is a view showing a schematic structure example of a hydraulic type injection molding machine, wherein a control system and a method for controlling of an embodiment of the present invention are applied.

Referring to FIG. 3, the hydraulic type injection molding machine where the present invention is applied includes an injection shaft 42 driven by a cylinder 41 for screw driving. That is, the injection shaft 42 is driven in an axial direction by controlling inflow and outflow of actuating oil to the cylinder 41 for screw driving.

A servo valve 43 for cylinder driving switches oil paths for the cylinder 41 for screw driving, an oil source 44, and an actuating oil tank 45. Injection pressure detectors 46 and 47 are provided at hydraulic pipes in order to detect an injection pressure as the resin pressure. A position detector 48 for detecting a screw position is provided at the injection shaft 42.

Injection pressure detectors 46 and 47 correspond to the load cell 18 shown in FIG. 2. Detected signals from the injection pressure detectors 46 and 47 and the position detector 48 are received by the controller 50 and thereby the controller 50 controls the servo valve 43 for cylinder driving. As a result of this, speed control in the filling process and pressure control in the hold press process are performed.

Next, an embodiment of the control system and the method for controlling of the present invention will be described.

In the embodiment of the control system and the method for controlling of the present invention, the retracting speed of the screw is controlled to have a predetermined limit value, namely a screw retracting speed limit value, after a pressure control begins in the hold press process following the V-P switching.

That is, the screw retracting speed limit is provided as one of molding conditions in the hold press process, so that control in the hold press process is automatically switched to either hold press pressure control or screw retracting speed control.

Figure 4:
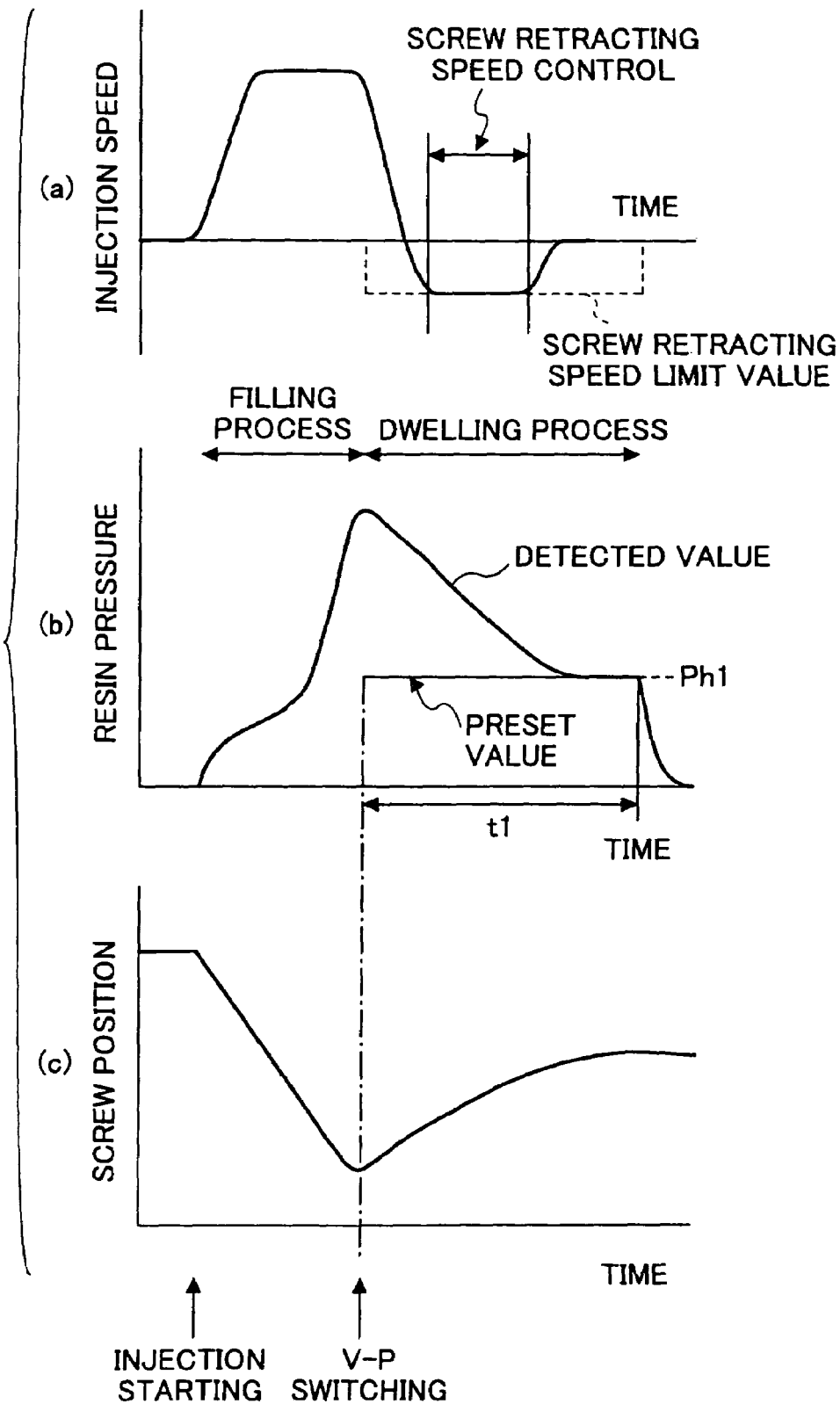
FIG. 4 is a view for explaining the filling process and hold press process of the molding cycle when a method for controlling of an embodiment of the present invention is applied.

FIG. 4 is a view for explaining the filling process and hold press process of the molding cycle when a method for controlling of an embodiment of the present invention is applied.

More specifically, FIG. 4-(a) shows a profile of injection speeds in the filling process and hold press process of the molding cycle when the method for controlling of the embodiment of the present invention is applied; FIG. 4-(b) shows a profile of the resin pressure in the filling process and hold press process of the molding cycle when the method for controlling of the embodiment of the present invention is applied; FIG. 4-(c) shows a profile of a screw position, that is the distance between the tip end of the screw and the end part at the nozzle side of the heating cylinder, in the filling process and hold press process of the molding cycle when the method for controlling of the embodiment of the present invention is applied.

In FIG. 4-(a), positive injection speed represents an advance of the screw and negative injection speed represents a retraction of the screw.

As shown in FIG. 4-(b), for convenience, only a first segment of pressure setting in the hold press process is shown. Control for the hold press process is performed based on setting the hold press pressure Ph1 and time t1. However, the present invention is not limited to the above mentioned example. The present invention may be applied to a case where a plurality of segments of hold press pressure are set.

As the injection begins, the screw advances as shown in FIG. 4-(a), and the distance between the tip end of the screw and the end part at the nozzle side of the heating cylinder is shortened, so that the resin fills the cavity of the mold.

In the hold press process after the V-P switching, a first operation amount is calculated based on a first difference between the retracting speed of the screw detected after the pressure control begins and the screw retracting speed limit value that is predetermined. Furthermore, in the hold press process after the V-P switching, a second operation amount is calculated based on a second difference between the hold press pressure detected after the pressure control begins and the hold press pressure preset value that is predetermined. Control is performed by selecting the greater of the first operation amount and the second operation amount.

Specifically, in the hold press process following the V-P switching, after the pressure control begins, in a case where the first operation amount is equal to or less than the second operation amount, pressure control equivalent to the conventional pressure control is performed. In a case where the first operation amount is greater than the second operation amount, the screw retracting speed is controlled to the screw retracting speed limit value. The control for the screw retracting speed is actually performed by a control for the screw position.

Figure 5:
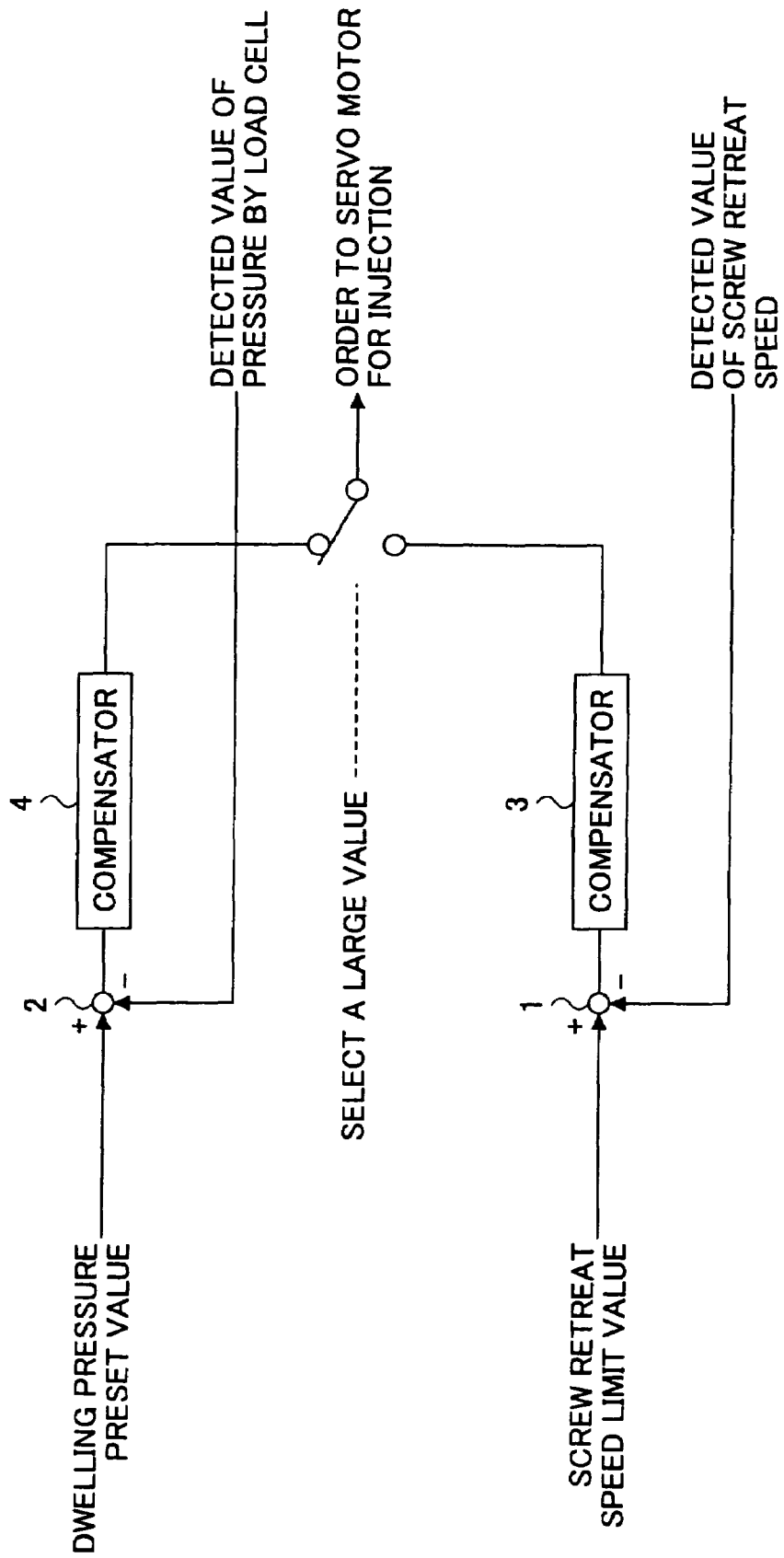
FIG. 5 is a function block diagram of retracting speed limit means in the hold press process performed by a controller of the control system for the motor-driven injection molding machine of the embodiment of the present invention.

FIG. 5 is a function block diagram of retracting speed limit means in the hold press process performed by a controller of the control system of the embodiment of the present invention.

First, an example wherein the control system and the method for controlling is applied to the motor-driven injection molding machine shown in FIG. 2 will be described.

The hold press pressure is detected as the resin pressure by the load cell 18 shown in FIG. 2 that functions as the pressure detecting means. A detection value by the position detector 27 shown in FIG. 2 is differentiated so that the screw speed is detected, by the speed detecting means. The controller 26 shown in FIG. 2 functions as the retracting speed limit means.

Referring to FIG. 5, after the pressure control begins in the hold press process following the V-P switching, the first difference between the screw retracting speed detection value (negative value) and the screw retracting speed limit value (negative value) that is predetermined is calculated by a first subtracter 1. Here, as described above, the screw retracting speed detection value is obtained by differentiating a value detected by the position detector 27 shown in FIG. 2. The second difference between the hold press pressure detected by the load cell 18 and the hold press pressure preset value that is predetermined is calculated by a second subtracter 2. A first compensator 3 outputs the first operation amount based on the first difference. A second compensator 4 outputs the second operation amount based on the second difference. These operation amounts have same dimensions. Particularly, it is easy to perform a relative operation when the above mentioned operation amounts are converted to dimensionless quantities.

The controller 26 shown in FIG. 2 compares the first operation amount and the second operation amount and selects a greater of the first operation amount and the second operation amount, so as to transmit the greater amount to the servo motor 11 for injection. Because of this, if the first operation amount is equal to or less than the second operation amount, pressure control the same as the conventional pressure control is performed. In a case where the first operation amount becomes greater than the second operation amount, the control for the screw retracting speed is performed so as to maintain the screw retracting speed at the screw retracting speed limit value.

Thus, the screw retracting speed has a limit value in the hold press process after the V-P switching so that the screw can be prevented from retracting at a high speed in the hold press process of the motor-driven injection molding machine. Hence, it is possible to prevent the molded article from adversely affected.

Next, an example wherein the control system and the method for controlling is applied to the hydraulic type injection molding machine shown in FIG. 3 will be described.

The hold press pressure is detected as the resin pressure by the injection pressure detectors 46 and 47 shown in FIG. 3 that function as the pressure detecting means. A detection value by the position detector 48 shown in FIG. 3 is differentiated so that the screw speed is detected, by the speed detecting means. The controller 50 shown in FIG. 3 functions as the retracting speed limit means.

FIG. 6 is a function block diagram of retracting speed limit means in the hold press process performed by a controller of the control system for the hydraulic type injection molding machine of the embodiment of the present invention. Referring to FIG. 6, after the pressure control begins in the hold press process following the V-P switching, the first difference between the screw retracting speed detection value (negative value) and the screw retracting speed limit value (negative value) that is predetermined is calculated by a first subtracter 1. Here, as described above, the screw retracting speed detection value is obtained by differentiating the value detected by the position detector 48 shown in FIG. 3.

The second difference between the hold press pressure detected by the injection pressure detectors 46 and 47 and the hold press pressure preset value that is predetermined is calculated by a second subtracter 2. A first compensator 3 outputs the first operation amount based on the first difference. A second compensator 4 outputs the second operation amount based on the second difference. These operation amounts have same dimensions.

The controller 50 shown in FIG. 3 compares the first operation amount and the second operation amount and select the greater of the first operation amount and the second operation amount, so as to transmit the greater amount to the servo valve 43 for cylinder driving. Because of this, if the first operation amount is equal to or less than the second operation amount, pressure control the same as the conventional pressure control is performed. In a case where the first operation amount becomes greater than the second operation amount, the control for the screw retracting speed is performed so as to maintain the screw retracting speed at the screw retracting speed limit value.

Thus, the screw retracting speed has a limit value in the hold press process after the V-P switching so that the screw can be prevented from retracting at a high speed in the hold press process of the hydraulic injection molding machine. Hence, it is possible to prevent the molded article from being adversely affected.

Since a limit value is provided for the screw retracting speed in the hold press process, it is possible to prevent adversely effects on the molded article due to the retracting of the screw at a high speed in the hold press process. Hence, it is possible to realize improvement of the measurement precision of the molded article in the injection molding and simplification of the molding condition determination.

In addition, in a case where the resin fills the cavity of the mold and the V-P switching is performed sufficiently before the detected resin pressure reaches the peak pressure that is set (so that the period of the filling process is shortened) and furthermore the screw retracting speed is controlled to the screw retracting speed limit value after the pressure control begins in the hold press process following the V-P switching, molding defects phenomena for the thin-walled molded article such as a short shot, sink, burr, warpage, and the like can be prevented effectively so that a molded article having high quality can be obtained.

The present invention is not limited to these embodiments, but variations and modifications may be made without departing from the scope of the present invention.

For example, in the above mentioned example, the control method of the present invention is applied to a case where the hold press pressure preset value is set at a first segment of the hold press process under conditions of the hold press pressure preset value Ph1 and time t1.

However, the present invention is not limited to the above mentioned example. The present invention may be applied to an optional hold press pressure in a case where plural segments of hold press pressure are set.

This patent application is based on Japanese priority patent application No. 2002-141423 filed on May 16, 2002, the entire contents of which are hereby incorporated by reference.

What is claimed is:

1. A control system for an injection molding machine that performs a molding cycle,
the molding cycle including a filling process for controlling an advancing motion of a screw of the injection molding machine, and a hold press process for controlling a pressure of a molten resin after the filling process,
the control system comprising
retracting speed limit means for limiting a retracting speed of the screw to a predetermined retracting speed limit value after a pressure control in the hold press process begins, for retracting the screw during the hold process, based on a difference between a detected pressure of the molten resin and a predetermined pressure of the molten resin, and for limiting the retracting speed of the screw, during the hold process, until the detected pressure of the molten resin reaches the predetermined pressure.

2. The control system for the injection molding machine as claimed in claim 1, further comprising:
pressure detection means for detecting a hold press pressure that is a resin pressure in the hold press process; and
speed detecting means for detecting the retracting speed of the screw,
wherein the retracting speed limit means comprises:
first calculation means for calculating a first operation amount based on a first difference between the retracting speed detected by the speed detecting means and the predetermined retracting speed limit value;
second calculation means for calculating a second operation amount based on a second difference between the hold press pressure detected by the pressure detection means and a hold press pressure preset value; and
control means for controlling the retracting speed of the screw based on the first operation amount when the first operation amount is greater than the second operation amount, and for controlling the hold press pressure based on the second operation amount when the first operation amount is equal to or less than the second operation amount.

3. The control system for the injection molding machine as claimed in claim 2, wherein
a plurality of the hold press pressure preset values are set in the hold press process, and
the second calculation means calculates the second operation amount based on the difference between the hold press pressure detected by the pressure detection means and an optional preset value of the plurality of the hold press pressure preset values.

4. The control system for the injection molding machine as claimed in claim 2, wherein
the second calculation means calculates the second operation amount based on the second difference between the hold press pressure detected by the pressure detection means and the hold press pressure preset value immediately after the hold press process begins.

5. The control system for the injection molding machine as claimed in claim 2, wherein
the injection molding machine comprises a motor-driven injection molding machine having a servo motor for injection;
the pressure detection means comprises a load cell detecting a resin pressure in an axial direction of the screw;
the speed detecting means comprises a position detector detecting a position of the screw;
a detected value obtained by the position detector is differentiated so that the retracting speed of the screw is detected; and
the retracting speed of the screw is controlled based on the first operation amount by controlling the servo-motor for injection.

6. The control system for the injection molding machine as claimed in claim 2, wherein
the injection molding machine comprises a hydraulic type injection molding machine having an injection cylinder and a servo valve controlling an inflow and outflow of actuating oil to the injection cylinder,
the pressure detection means comprises a hydraulic detector detecting a hydraulic pressure of the injection cylinder;
the speed detecting means comprises a position detector detecting a position of the screw;
a detected value obtained by the position detector is differentiated so that the retracting speed of the screw is detected; and
the retracting speed of the screw is controlled based on the first operation amount by controlling the servo-valve.

7. A method for controlling an injection molding machine that performs a molding cycle,
the molding cycle including a filling process for controlling an advancing motion of a screw of the injection molding machine, and a hold press process for controlling a pressure of a molten resin after the filling process,
the method comprising
a step for limiting a retracting speed of the screw to a predetermined retracting speed limit value after a pressure control in the hold press process begins;
retracting the screw, during the hold process, based on a difference between a detected pressure of the molten resin and a predetermined pressure of the molten resin; and
limiting a retracting speed of the screw, during the hold process, until the detected pressure of the molten resin reaches the predetermined pressure.

8. The method for controlling the injection molding machine as claimed in claim 7, wherein
the retracting speed of the screw is detected, so that a first operation amount based on a first difference that is the difference between the retracting speed that is detected and the retracting speed limit value is calculated,
a hold press pressure that is a resin pressure in the hold press process is detected, so that a second operation amount based on a second difference that is the difference between the hold press pressure that is detected and a hold press pressure preset value is calculated,
the retracting speed of the screw is controlled based on the first operation amount when the first operation amount is greater than the second operation amount, and
the pressure control is performed based on the second operation amount when the first operation amount is equal to or less than the second operation amount.

9. The method for controlling the injection molding machine as claimed in claim 8, wherein
a plurality of the hold press pressure preset values are set in the hold press process, and
the second operation amount is calculated based on the second difference between the hold press pressure detected by a pressure detection means and an optional preset value of the hold press pressure preset value in the plurality of the hold press pressure preset values that are set.

10. A method for controlling an injection molding machine comprising the steps of:
   a) advancing a screw of the injection molding machine so that a cavity of a mold is filled with a molten resin;
   b) retracting the screw based on a difference between a detected pressure of the molten resin and a predetermined pressure of the molten resin; and
   c) limiting a retracting speed of the screw until the detected pressure of the molten resin reaches the predetermined pressure.

11. The method for controlling the injection molding machine as claimed in claim 10, wherein
   the pressure of the molten resin is detected by a pressure detecting means, and
   the retracting speed is detected by a speed detecting means.

12. The method for controlling the injection molding machine as claimed in claim 10, wherein
   a first operation amount is generated based on a first difference between the retracting speed and a predetermined retracting speed limit value, and
   a second operation amount is generated based on a second difference between the pressure of the molten resin detected by the pressure detecting means and a predetermined pressure value.

13. The method for controlling the injection molding machine as claimed in claim 12, wherein
   the screw is operated based on the first operation amount when the first operation amount is greater than second operation amount, and
   the screw is operated based on the second operation amount when the first operation amount is equal to or less than second operation amount.

14. A control system for an injection molding machine,
   the injection molding machine including a screw which is advanced by a driving device so that a cavity of a mold is filled with a molten resin, and which is retracted based on a difference between a detected pressure of the molten resin and a predetermined pressure of the molten resin after the mold is filled with the molten resin,
   the control system comprising a controller for
      limiting a retracting speed of the screw until the detected pressure of the molten resin reaches the predetermined pressure;
      retracting the screw, during the hold process, based on a difference between a detected pressure of the molten resin and a predetermined pressure of the molten resin; and
      limiting a retracting speed of the screw, during the hold process, until the detected pressure of the molten resin reaches the predetermined pressure.

15. The control system for the injection molding machine as claimed in claim 14, further comprising:
   a pressure detecting device for detecting the pressure of the molten resin; and
   a speed detecting device for detecting the retracting speed of the screw.

16. The control system for the injection molding machine as claimed in claim 14, further comprising:
   a first calculating device for generating a first operation amount based on a first difference between the retracting speed of the screw and a predetermined retracting speed limit value of the screw; and
   a second calculating device for generating a second operation amount based on a second difference between the detected pressure of the molten resin and the predetermined pressure of the molten resin.

17. The control system for the injection molding machine as claimed in claim 16 wherein
   the screw is controlled based on the first operation amount when the first operation amount is greater than second operation amount, and
   the screw is controlled based on the second operation amount when the first operation amount is equal to or less than second operation amount.

* * * * *